(12) United States Patent
Green

(10) Patent No.: US 6,516,975 B2
(45) Date of Patent: Feb. 11, 2003

(54) COTTONSEED FEEDER

(75) Inventor: Roderick Stephen Green, Queensland (AU)

(73) Assignee: GTS Investments PTY Ltd., Queensland (AU)

(*) Notice: Subject to any disclaimer, the term of this patent is extended or adjusted under 35 U.S.C. 154(b) by 0 days.

(21) Appl. No.: 10/189,537

(22) Filed: Jul. 8, 2002

(65) Prior Publication Data

US 2003/0006255 A1 Jan. 9, 2003

(30) Foreign Application Priority Data

Jul. 9, 2001 (AU) ........................................ 2001100140

(51) Int. Cl.$^7$ .............................................. B65D 83/00
(52) U.S. Cl. ...................... 222/202; 222/447; 222/504; 222/561; 222/564
(58) Field of Search ................................. 222/202, 444, 222/447, 451, 504, 547, 561, 564, 608, 239

(56) References Cited

U.S. PATENT DOCUMENTS

| | | | |
|---|---|---|---|
| 2,111,915 A | * | 3/1938 | MacMillin .................. 222/447 |
| 3,972,861 A | | 8/1976 | Gardner, Jr. et al. |
| 4,064,636 A | | 12/1977 | Downing |
| 4,084,007 A | | 4/1978 | Hipp et al. |
| 4,139,646 A | | 2/1979 | Gastrock |
| 4,154,021 A | | 5/1979 | Griffith et al. |
| 4,155,315 A | | 5/1979 | Dobbins |
| 4,201,709 A | | 5/1980 | Kadan et al. |
| 4,216,616 A | | 8/1980 | Smith, Jr. |
| 4,219,469 A | | 8/1980 | Kadan et al. |
| 4,259,764 A | | 4/1981 | Downing |
| 4,279,811 A | | 7/1981 | Gray et al. |
| 4,307,118 A | | 12/1981 | Kajs |
| 4,332,719 A | | 6/1982 | Lawhon et al. |
| 4,343,070 A | | 8/1982 | Wade et al. |
| 4,359,417 A | | 11/1982 | Karnofsky et al. |
| 4,371,449 A | | 2/1983 | Smith, Jr. |
| 4,546,004 A | | 10/1985 | Rhee et al. |
| 4,747,979 A | | 5/1988 | Gimber et al. |
| 4,942,643 A | | 7/1990 | Kincer et al. |
| 4,967,448 A | | 11/1990 | Mizer |
| 5,077,441 A | | 12/1991 | Kuk et al. |
| 5,112,637 A | | 5/1992 | Hron, Sr. et al. |
| 5,270,062 A | | 12/1993 | Buchs |
| 5,277,909 A | | 1/1994 | Schmidt et al. |
| 5,423,107 A | | 6/1995 | Thrash |
| 5,573,149 A | * | 11/1996 | Saito .......................... 222/239 |
| 5,632,116 A | | 5/1997 | Dismuke, Jr. et al. |
| 5,750,466 A | | 5/1998 | Wedegaertner et al. |
| 5,787,640 A | | 8/1998 | Duke |
| 5,972,414 A | | 10/1999 | Harris |
| 6,051,269 A | | 4/2000 | Harris |
| 6,263,833 B1 | | 7/2001 | Runyan et al. |

FOREIGN PATENT DOCUMENTS

| | | |
|---|---|---|
| DE | 3446791 | 7/1985 |
| DE | 4116327 | 11/1992 |
| RU | 1796910 94-13387 | 2/1993 |

* cited by examiner

*Primary Examiner*—Philippe Derakshani
(74) *Attorney, Agent, or Firm*—Hoffman, Wasson & Gitler PC

(57) ABSTRACT

A cottonseed feeder wherein the dispensing means for dispensing the feed from the hopper comprises a feed chamber having an entry-opening and an exit-opening, the entry-opening in communication with the lower opening of a feed hopper, an entry-opening shutter adjacent the entry-opening, said entry-opening shutter moveable between a first position where the entry-opening shutter blocks the entry-opening and a second free position where feed may flow into the feed chamber, an exit-opening shutter adjacent the exit-opening moveable between a first position where the exit-opening shutter blocks the exit-opening and a second free position where feed disposed within the feed chamber may flow out of the feed chamber and a connecting member associated with the entry-opening shutter and the exit-opening shutter wherein the entry-opening shutter and the exit-opening shutter are linked such that movement of the entry-opening shutter from its first position to its second position coincides with the movement of the exit-opening shutter from its second position to its first position.

4 Claims, 1 Drawing Sheet

COTTONSEED FEEDER

TECHNICAL FIELD

This invention relates to distributing a predetermined amount of feed to animals and in particular to an improved method for the supplementary feeding of cottonseed to animals.

BACKGROUND ART

Cottonseed is a very good supplementary feed that is commonly used where cottonseed is readily available. Cattle are fed approximately one kilogram per day, twice per week. The feed is normally fed out in measured lots across the paddock to ensure that gorging is kept to a minimum. Cottonseed is a very nutritious feed material for the animals but it has major drawbacks. To maximize the benefits, it must be fed in a measured ration and it is very difficult to handle due to the presence of cotton lint around each seed. This lint creates enormous relative inertia, which results in clogging and compaction within the storage or dispensing bin. This makes it very difficult to dispense or "feed out" using conventional bulk mobile feeders.

The normal method of dispensing the cottonseed feed is to shovel the feed into and out of a truck or trailer. An alternative method is using 20 litre drums with the tops removed to measure and hold a predetermined amount of cottonseed. The drums are then transported into the paddocks to be emptied out onto the ground.

A mobile spreader is disclosed in U.S. Pat. No. 4,449,648. This device comprises a tractor and a detachable hopper. The latter is defined by tapering front and rear walls and has a breadth permitting it to fit in between the rear wheels of the tractor. There is an elongate spreader opening in the bottom of the hopper, and an agitator adjacent to the mechanism driven by a roller to be brought into contact with one of the rear wheels of the tractor.

Pivots at the front wall of the hopper are attachable to brackets at the tractor, and are located so the point of gravity of the hopper tends to tilt it away from the tractor. In its furthermost tilted position the rear wall will be substantially parallel to the ground, and the hopper may then be used to scoop up particulate material to be spread. A pressure fluid actuator raises the hopper to an upright position, in which finally the roller contacts the rear wheel of the tractor and drives the agitator.

Another type of mobile spreader is disclosed in U.S. Pat. No. 4,155,315. This type is drawn by a tractor and includes a hopper mounted on a roller. The roller is provided with a jarring strip which imparts a jolt to the hopper on each revolution of the roller. This jolting action prevents bridging of the material in the hopper, knocking the hung-up material down into the lower portion of the hopper where an agitator and an impellor further stir up the material.

The cooperative effect of the jarring strip, the agitator and the impellor is to provide a steady supply of material, even when moist material is being distributed. The rate of application of the material is controlled by a slidable apertured plate disposed across an opening in the bottom of the hopper. The spreader may be selectively provided with a rake, a floater plate, and a spiker.

The spiker may be attached in front of the roller to open the turf to receive the material, or behind the roller to work the applied material into the turf. In addition, the spiker aerates the turf. The spreader is provided with a set of reverse pick-up points as well as the normal pick-up points to permit the spreader to be drawn in a backward or forward orientation, respectively, by a tractor. This permits the spreader to be used for applying an unusually wide variety of treatments to the turf.

Liquid dispensers as disclosed in U.S. Pat. No. 4,014,271 are also a part of the art. These devices include a mobile spreader tank to contain the liquid manure and adapted to be drawn by a tractor. A frame is supported by the three-point hitch of the tractor, and a series of soil working elements are mounted on the frame and are adapted to penetrate the soil when the frame is lowered.

A delivery tube for the liquid manure is positioned behind each soil-working element, and a flexible conduit connects each delivery tube with a valve-controlled outlet in the tank. The liquid manure is delivered through the conduit system to the delivery tubes by an auger located within the tank, or alternately, by pressurising the spreader tank.

All of the above devices struggle to overcome the problems of spreading cottonseed. They cannot deal with the nature of the cottonseed as a feed product. They also do not seal well and therefore wastage of the feed occurs.

It may be difficult to dispense a predetermined amount of feed in a paddock as the dispenser may open by itself at intervals which cannot be controlled by a user.

Overfeeding of livestock is wasteful and may lead to sickness or lack of condition and therefore reduced prices at market.

DISCLOSURE OF INVENTION

It is an object of the present invention to provide a cottonseed feeder which at least partially overcomes or ameliorates the above-mentioned disadvantages or provides the consumer with a useful or commercial choice.

Further objects and advantages of the present invention will become apparent from the ensuing description which is given by way of example.

According to one aspect of the present invention a cottonseed feeder is provided having
(a) a feed hopper with at least one angled sidewall, having a lower opening and an upper opening,
(b) a baffle member disposed within the hopper,
(c) a revolving agitator disposed within the hopper,
(d) a vibrator to reduce the compression of the feed within the hopper and
(e) a dispensing means for dispensing the feed from the hopper wherein the dispensing means comprises
  (i) a feed chamber having an entry-opening and an exit-opening, the entry-opening in communication with the lower opening of the feed hopper,
  (ii) an entry-opening shutter adjacent the entry-opening, said entry-opening shutter moveable between a first position where the entry-opening shutter blocks the entry-opening and a second free position where feed may flow into the feed chamber,
  (iii) an exit-opening shutter adjacent the exit-opening moveable between a first position where the exit-opening shutter blocks the exit-opening and a second free position where feed disposed within the feed chamber may flow out of the feed chamber and
  (iv) a connecting member associated with the entry-opening shutter and the exit-opening shutter wherein the entry-opening shutter and the exit-opening shutter are linked such that movement of the entry-opening shutter from its first position to its second position coincides with the movement of the exit-opening shutter from its second position to its first position.

The cottonseed feeder may preferably also have a hydraulic ram to move the entry-opening shutter and the exit-opening shutter between their first and second positions.

The baffle member may preferably be a mesh member having a plurality of openings, the mesh member being large enough to allow flow of feed into the feed chamber and reduce the compaction of the feed within the feed hopper.

The agitator may preferably comprise (a) a central hub member rotating around a substantially horizontal axis, (b) a rotating member associated with the central hub and (c) a plurality of projecting members radiating from the rotating member, said projecting members spaced around the periphery of the rotating member, wherein rotation of the agitator at least partially disturbs the feed disposed within the feed hopper.

The agitator may also preferably comprise a horizontally rotating central metal tube or rod with a plurality of offset metal posts mounted at right angles to the central tube or rod. Each metal post may suitably have a metal paddle mounted on the end furthest from the connection of the metal posts to the central tube or rod to aid in the disturbance to the cottonseed.

The vibrator may preferably comprise a 12 volt electric motor (either AC or DC), driving a horizontally mounted shaft with an offset weight on one end to create a vibration. The motor and shaft may preferably be mounted to the metal hopper to effectively transmit the vibrations to the hopper and thus to the feed contained in the hopper.

The walls of the hopper may preferably have different angles of inclination to the horizontal in order to lower the degree of compaction or blocking of the cottonseed in the hopper. A first endwall may preferably have an angle of inclination of between 50° and 55° to the horizontal. A second endwall may preferably have an angle of between 37° and 42° to the horizontal.

The cottonseed feeder may preferably be mounted on a trailer, truck or the like to facilitate the transport of the feeder to the required paddock or location.

BRIEF DESCRIPTION OF THE DRAWINGS.

Aspects of the present invention will now be described with reference to the accompanying drawings in which.

BEST MODE

Figure 1:
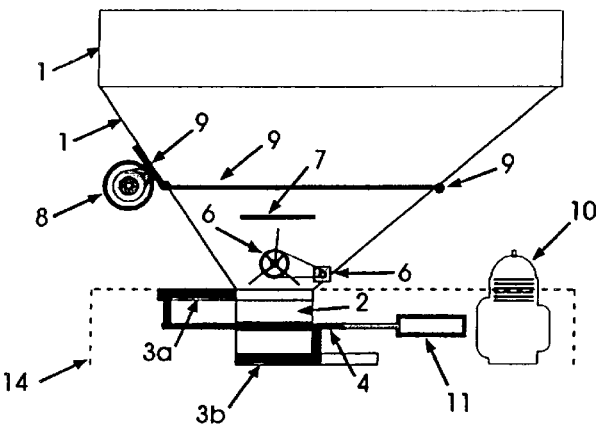
FIG. 1 shows a side elevation view of a preferred aspect of the present invention.

As can be seen in FIG. 1, the cottonseed feeder according to an aspect of the present invention has a metal hopper 1 having angled sidewalls, connected to a metal feed chamber 2. The feed chamber 2 has an entry-opening and an exit-opening. The entry-opening of the feed chamber 2 is in communication with the lower opening of the feed hopper.

There is an entry-opening shutter 3a adjacent the entry-opening, the entry-opening shutter 3a moveable between a first position where the entry-opening shutter 3a blocks the entry-opening and a second free position where feed may flow into the feed chamber 2.

The feed chamber 2 also has an exit-opening shutter 3b adjacent the exit-opening moveable between a first position where the exit-opening shutter 3b blocks the exit-opening and a second free position where feed disposed within the feed chamber 2 may flow out of the feed chamber.

A connecting member 4 connects the entry-opening shutter 3a and the exit-opening shutter 3b wherein the entry-opening shutter 3a and the exit-opening shutter 3b are linked such that movement of the entry-opening shutter 3a from its first position to its second position coincides with the movement of the exit-opening shutter 3b from its second position to its first position.

In addition to providing a measured ration, the invention also overcomes the problems of clogging and compaction. To achieve this, a pneumatically operated chain driven metal agitator 6 is mounted above the entry-opening shutter 3a. To help control compaction, a horizontal metal baffle 7, is installed above the agitator. To aid the flow of cottonseed through the hopper, an electric motor driven vibrator 8 is attached to the hopper and the baffle by metal brackets and a connecting rod 9.

A petrol driven air compressor 10 provides the compressed air to operate the air ram 11, used to move the entry-opening and exit-opening shutters 3a, 3b.

Figure 2A:
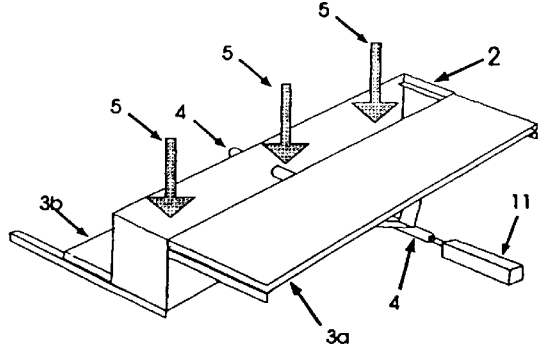
FIG. 2a shows a perspective view of the dispensing means for dispensing the feed with the entry-opening shutter in its second position and the exit-opening shutter in its first position allowing feed from the hopper into the feed chamber.

FIG. 2a shows the moveable entry-opening shutter 3a in its second position allowing feed to enter the feed chamber 2. The exit-opening shutter 3b is disposed in its first position. The arrows 5 indicate the direction of flow of the cottonseed through the feeder.

Figure 2B:
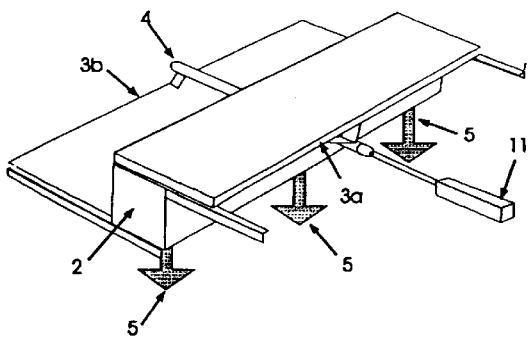
FIG. 2b shows a perspective view of the dispensing means for dispensing the feed with the entry-opening shutter in its first position and the exit-opening shutter in its second position allowing feed to be released from the feed chamber.

FIG. 2b shows the moveable entry-opening shutter 3a in its first position blocking the entry of further feed to the feed chamber 2. The exit-opening shutter 3b is disposed in its second position allowing feed to leave the feed chamber 2. The arrows 5 indicate the direction of flow of the cottonseed through the feeder.

Figure 3:
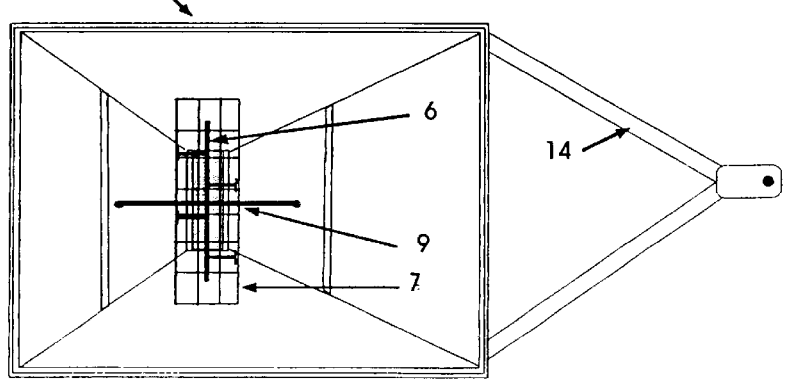
FIG. 3 shows a plan view of the cottonseed feeder with a truck attachment.

FIG. 3 shows the feeder in plan view. This version of the invention is mounted on a trailer 14 and shows the positioning of the hopper 1, the agitator 6, the baffle member 7, and the connecting rod for the vibrator 9.

In use, the cottonseed feeder is moved to the preferred location on a trailer. The opposed entry-opening 3a and exit-opening shutters 3b are alternately moved from their first position to their second position, blocking and unblocking the openings to and from the feed chamber 2.

The feeder allows a controlled amount of cottonseed to be dropped each time the exit-opening shutter 3b is opened.

The chain-driven metal agitator 6 mounted in the hopper 1 above the entry-opening shutter 3a and a vibrator 8 attached to the hopper 1 provides enough disturbance to the cottonseed to allow it to flow readily into the feed chamber 2.

Whole cottonseed is loaded into the hopper 1 with a front-end loader or similar machinery. During this process, the entry-opening shutter 3a is disposed in its first position, blocking the entry to the feed chamber 2. The compressor 10 is then started and the feeder is towed into a paddock to commence feeding.

The feed chamber 2 holds approximately 10 kilograms of cottonseed when full and the required number of drops in each paddock can be calculated. The air ram 11 may then be activated which moves the entry-opening shutter 3a to its second position and at the same time moves the exit-opening shutter 3b to its first position.

The agitator 6 is then activated until the feed chamber 2 is full. This action normally takes a few seconds. Once the feed chamber 2 is full, the air ram 11 is activated again to move the entry-opening shutter 3a to its first position and at the same time moves the exit-opening shutter 3b to its second position. This allows the feed in the feed chamber 2 to fall out, while not allowing any feed from the hopper 1 to be dropped.

The process is repeated until the required amount of feed has been dropped.

The entry-opening shutter is then left in its first position during transport from one paddock to the next paddock to help control the compaction of the cottonseed.

Aspects of the present invention have been described by way of example only and it will be appreciated that modifications and additions thereto may be made without departing from the scope thereof, as defined in the appended claims.

What is claimed is:

1. A cottonseed feeder comprising
   (a) a feed hopper with at least one angled sidewall, having a lower opening and an upper opening,
   (b) a baffle member disposed within the hopper,
   (c) a revolving agitator disposed within the hopper,
   (d) a vibrator to reduce the compression of the feed within the hopper and
   (e) a dispensing means for dispensing the feed from the hopper wherein the dispensing means comprises
      (i) a feed chamber having an entry-opening and an exit-opening, the entry-opening in communication with the lower opening of the feed hopper,
      (ii) an entry-opening shutter adjacent the entry-opening, said entry-opening shutter moveable between a first position where the entry-opening shutter blocks the entry-opening and a second free position where feed may flow into the feed chamber,
      (iii) an exit-opening shutter adjacent the exit-opening moveable between a first position where the exit-opening shutter blocks the exit-opening and a second free position where feed disposed within the feed chamber may flow out of the feed chamber and
      (iv) a connecting member associated with the entry-opening shutter and the exit-opening shutter wherein the entry-opening shutter and the exit-opening shutter are linked such that movement of the entry-opening shutter from its first position to its second position coincides with the movement of the exit-opening shutter from its second position to its first position.

2. The cottonseed feeder of claim 1 wherein the entry-opening shutter and the exit-opening shutter are moveable by a hydraulic ram.

3. The cottonseed feeder of either claim 1 wherein the baffle member comprises a mesh member having a plurality of openings, the mesh member being large enough to allow flow of feed into the feed chamber and reduce the compaction of the feed within the feed hopper.

4. The cottonseed feeder of claim 1 wherein the agitator comprises
   (a) a central hub member rotating around a substantially horizontal axis,
   (b) a rotating member associated with the central hub and
   (c) a plurality of projecting members radiating from the rotating member, said projecting members spaced around the periphery of the rotating member,
      wherein rotation of the agitator at least partially disturbs the feed disposed within the feed hopper.

* * * * *